(12) United States Patent
Wang et al.

(10) Patent No.: US 10,015,808 B2
(45) Date of Patent: Jul. 3, 2018

(54) METHOD OF DETECTING DEVICE RESOURCE-UTILIZATION AND ADJUSTING DEVICE BEHAVIOR AND RELATED WIRELESS DEVICE

(71) Applicant: Panasonic Intellectual Property Corporation of America, Torrance, CA (US)

(72) Inventors: Lilei Wang, Beijing (CN); Hidetoshi Suzuki, Kanagawa (JP); Masayuki Hoshino, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/119,630

(22) PCT Filed: Mar. 20, 2014

(86) PCT No.: PCT/CN2014/073778
§ 371 (c)(1),
(2) Date: Aug. 17, 2016

(87) PCT Pub. No.: WO2015/139268
PCT Pub. Date: Sep. 24, 2015

(65) Prior Publication Data
US 2017/0071007 A1   Mar. 9, 2017

(51) Int. Cl.
*H04W 72/04* (2009.01)
*H04W 72/12* (2009.01)
(Continued)

(52) U.S. Cl.
CPC ......... *H04W 72/12* (2013.01); *H04W 4/005* (2013.01); *H04W 4/70* (2018.02); *H04W 28/08* (2013.01);
(Continued)

(58) Field of Classification Search
CPC ... H04W 72/085; H04W 24/10; H04W 28/08; H04W 28/0231; H04W 40/12;
(Continued)

(56) References Cited

U.S. PATENT DOCUMENTS

2006/0142020 A1* 6/2006 Mueckenheim .. H04W 72/0486
455/453
2006/0142021 A1* 6/2006 Mueckenheim ...... H04W 36/22
455/453

(Continued)

FOREIGN PATENT DOCUMENTS

| CN | 103229582 A | 7/2013 |
| EP | 2 999 284 A1 | 3/2016 |
| WO | 2014/185400 A1 | 11/2014 |

OTHER PUBLICATIONS

International Search Report dated Dec. 24, 2014, for corresponding International Application No. PCT/CN2014/073778, 2 pages.

*Primary Examiner* — Sai Aung
(74) *Attorney, Agent, or Firm* — Seed IP Law Group LLP

(57) ABSTRACT

Provided are resource-utilization controlling methods for a device-to-device communication and wireless devices therefor. The method performed by a first wireless device comprises steps of: detecting current utilization state of the resource for the device-to-device communication as a resource utilization state; and explicitly or implicitly signaling the resource utilization state through broadcasting in the physical layer. The method performed by a second wireless device comprises steps of: receiving one or more resource utilization states explicitly or implicitly signaled from one or more other wireless devices; and determining whether and/or how to adjust the transmission behavior of the second wireless device based on the received one or more resource utilization states.

15 Claims, 4 Drawing Sheets

(51) Int. Cl.
*H04W 28/08* (2009.01)
*H04W 4/00* (2018.01)
*H04W 4/70* (2018.01)
*H04W 72/00* (2009.01)
*H04W 92/18* (2009.01)
*H04W 88/02* (2009.01)
*H04W 88/08* (2009.01)

(52) U.S. Cl.
CPC ............ *H04W 72/00* (2013.01); *H04W 88/02* (2013.01); *H04W 88/08* (2013.01); *H04W 92/18* (2013.01)

(58) Field of Classification Search
CPC . H04W 48/18; H04W 72/0453; H04W 4/005; H04W 28/20; H04W 16/08; H04W 16/14; H04W 36/22; H04W 72/0406; H04W 72/1257; H04W 72/1278
See application file for complete search history.

(56) References Cited

U.S. PATENT DOCUMENTS

2009/0116511 A1* 5/2009 Anderson ............... H04L 45/00
370/468
2013/0157676 A1 6/2013 Baek et al.
2013/0170342 A1* 7/2013 Alnuem ............... H04L 47/283
370/230
2013/0272219 A1* 10/2013 Singh .................. H04W 16/14
370/329

* cited by examiner

METHOD OF DETECTING DEVICE RESOURCE-UTILIZATION AND ADJUSTING DEVICE BEHAVIOR AND RELATED WIRELESS DEVICE

TECHNICAL FIELD

The present disclosure relates to the field of device to device (D2D) communication, and in particular, to resource-utilization controlling methods and wireless devices.

BACKGROUND

Device-to-device (D2D) communication is direct communication between devices and is a new topic in 3GPP ($3^{rd}$ Generation Partnership Project) LTE (Long Term Evolution) Release 12. D2D communication could happen with wireless network coverage (e.g. for commercial case) or without network coverage (e.g. for public safety). FIG. 1 illustrates exemplary D2D communications with and without wireless network coverage. On the left side of FIG. 1, UE 101 and UE 102 are within the wireless network coverage of eNB (eNode B) 103, but they are communicating with each other directly (i.e. not through eNB 103). On the right side of FIG. 1, UE 104 and UE 105 are not within any wireless network coverage, and they are communicating with each other directly.

3GPP RAN1#76 meeting agreed eNB scheduling based resource allocation (Mode 1) as baseline method in network-coverage (INC) scenario and UE selection on its own based resource allocation (Mode 2) is baseline method in edge-of-coverage or out-of-coverage (OOC) scenario. In case of INC scenario, the resource collision could be avoided by eNB and the resource utilization is relatively high. However, in case of OOC scenario, the collision may not be avoided based on Mode 2 resource allocation method. If the collision probability is large due to congested load, it would impact the system performance very much.

SUMMARY OF THE DISCLOSURE

The present disclosure is made in view of the above in order to realize resource-utilization controlling for a device-to-device communication, especially for OOC scenario.

In a first aspect of the present disclosure, there is provided a resource-utilization controlling method for a device-to-device communication performed by a first wireless device, comprising steps of: detecting current utilization state of the resource for the device-to-device communication as a resource utilization state by monitoring data channel and/or control channel of the device-to-device communication; and explicitly or implicitly signaling the resource utilization state through broadcasting in the physical layer for other wireless devices which receive the resource utilization state to determine whether and/or how to adjust their transmission behavior based on the resource utilization state.

Preferably, the method according to the first aspect can further comprise steps of: determining whether and/or how to adjust the transmission behavior of the first wireless device based on the resource utilization state; and adjusting the transmission behavior of the first wireless device if it is determined to adjust the transmission behavior of the first wireless device.

In a second aspect of the present disclosure, there is provided a resource-utilization controlling method for a device-to-device communication performed by a second wireless device, comprising steps of: receiving one or more resource utilization states explicitly or implicitly signaled from one or more other wireless devices through broadcasting in the physical layer, each of the one or more resource utilization states indicating a utilization state of the resource for the device-to-device communication when the utilization state was detected; determining whether and/or how to adjust the transmission behavior of the second wireless device based on the received one or more resource utilization states; and adjusting the transmission behavior of the second wireless device if it is determined to adjust the transmission behavior of the second wireless device.

In a third aspect of the present disclosure, there is provided a wireless device as a first wireless device for a device-to-device communication, comprising: a detecting unit configured to detect current utilization state of the resource for the device-to-device communication as a resource utilization state by monitoring data channel and/or control channel of the device-to-device communication; and a signaling unit configured to explicitly or implicitly signal the resource utilization state through broadcasting in the physical layer for other wireless devices which receive the resource utilization state to determine whether and/or how to adjust their transmission behavior based on the resource utilization state.

Preferably, the wireless device according to the third aspect can further comprise: a determining unit configured to determine whether and/or how to adjust the transmission behavior of the first wireless device based on the resource utilization state; and an adjusting unit configured to adjust the transmission behavior of the first wireless device if it is determined to adjust the transmission behavior of the first wireless device.

In a fourth aspect of the present disclosure, there is provided a wireless device as a second wireless device for a device-to-device communication performed, comprising: a receiving unit configured to receive one or more resource utilization states signaled from one or more other wireless devices through broadcasting in the physical layer, each of the one or more resource utilization states indicating a utilization state of the resource for the device-to-device communication when the utilization state was detected; a determining unit configured to determine whether and/or how to adjust the transmission behavior of the second wireless device based on the received one or more resource utilization states; and an adjusting unit configured to adjust the transmission behavior of the second wireless device if it is determined to adjust the transmission behavior of the second wireless device.

The foregoing is a summary and thus contains, by necessity, simplifications, generalization, and omissions of details. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
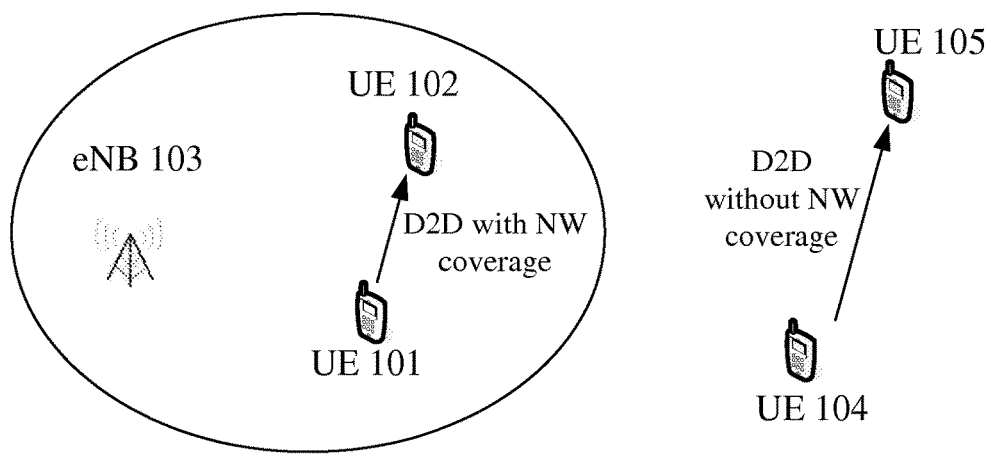
FIG. 1 illustrates exemplary D2D communications with and without wireless network coverage.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

It is noted that some descriptions are made based on user equipments (UEs) in the specification; however, the wireless devices for D2D communication in the present disclosure are not limited to UEs but can be for example notebooks, pads, sensors or other devices with wireless communication capability. In addition, the terms of "first wireless device" and "second wireless device" in the present disclosure are only used to distinguish the devices when describing them, but do not mean the orders in time or priority of the devices.

For D2D communication, it is important to find a solution to adaptively adjust the load of a D2D group or cluster in order to keep a reasonable collision probability and resource utilization, especially in OOC scenario. To this end, the present disclosure provides a resource-utilization controlling solution for the D2D communication. It is noted that the solutions provided in the present disclosure may also apply to INC scenario.

Figure 2:
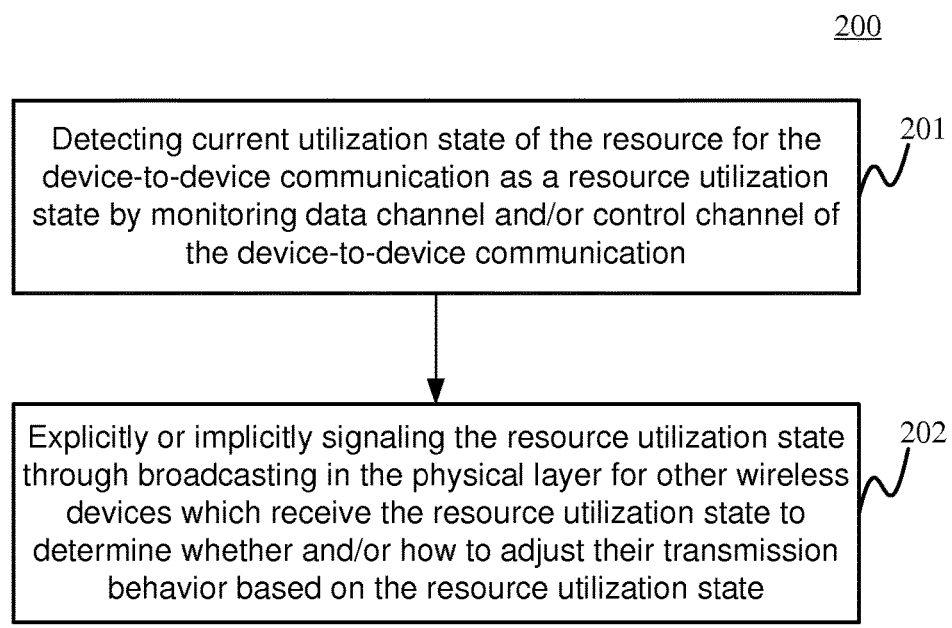
FIG. 2 illustrates a flowchart of a resource-utilization controlling method performed by a first wireless device according to an embodiment of the present disclosure.

FIG. 2 illustrates a flowchart of a resource-utilization controlling method 200 performed by a first wireless device according to an embodiment of the present disclosure. Here, the first wireless device can be any wireless device in a D2D group, for example, a UE in a UE group for D2D communication.

At step 201, the first wireless device detects current utilization state of the resource for the device-to-device communication as a resource utilization state by monitoring data channel and/or control channel of the device-to-device communication.

Figure 3:
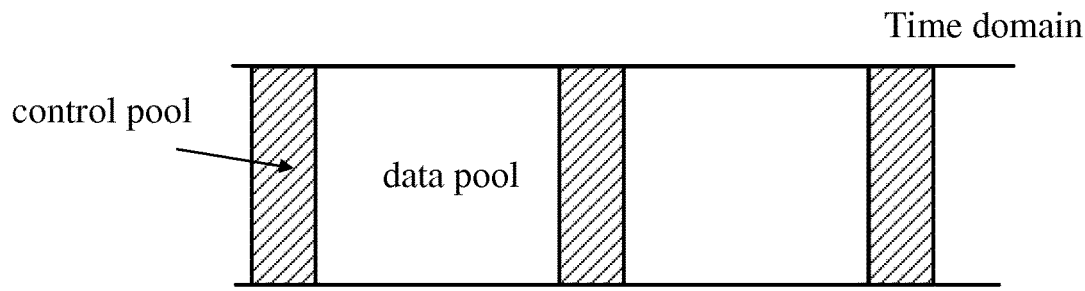
FIG. 3 schematically illustrates the control pool and the data pool in D2D communication.

In D2D communication, there can be data channel (or data pool) and control channel (or data pool) in the resource for the communication. As schematically shown in FIG. 3, one subframe can be divided into control pool (e.g. scheduling assignment pool) and data pool. The control pool is used for transmitting control information and the data pool is used for transmitting data. Congestion or collision could happen in both the pools or channels. In the present disclosure, the first wireless device can detect the utilization state of either of the two channels or both of the two channels by monitoring them. For example, the first wireless device can decode the control channel to know the load of the control channel and also the data channel. However, it is noted that the resource division in FIG. 3 is only an example, and the present disclosure is not limited to that. For example, data and control information may be transmitted together and the resource may not be explicitly divided into data channel and control channel, which is also within the scope of the present disclosure. Therefore, the resource utilization state can indicate the utilization state of data resource (data channel), or indicate the utilization state of control resource (control channel), or indicate both the utilization state of data resource and the utilization state of control resource. In addition, the resource utilization state can indicate either the utilization state of data resource or the utilization state of control resource alternately. That is, in one subframe, the resource utilization state indicates the utilization state of control resource, and in the next subframe, the resource utilization state indicates the utilization state of data resource, and so on. Alternatively, the resource utilization state can indicate either the utilization state of data resource or the utilization state of control resource based on the system frame number (SFN) or subframe number for signaling the resource utilization state.

For example, if the SFN or the subframe number is odd, the resource utilization state indicates the utilization state of control resource, and if the SFN or the subframe number is even, the resource utilization state indicates the utilization state of data resource.

In the present disclosure, the first wireless device can detect the utilization ratio of the resource and take the utilization ratio as the resource utilization state. The first wireless device can also compare the utilization ratio with a predetermined threshold to obtain a result indicating whether the utilization of the resource is congested, and take the result as the resource utilization state. For example, if the utilization ratio exceeds 50% (that is, the predetermined threshold is set as 50%), the resource utilization state indicates that the resource is congested. In this case, one bit can be used to indicate the resource utilization state. For example, "1" indicates that the resource is congested and "0" indicates that the resource is not congested. Alternatively, the resource utilization state can indicate whether the utilization of the resource collides. For example, when the first wireless device detects that the remaining resource is not enough to transmit the data or control information to be transmitted, the resource utilization state indicates the utilization of the resource collides. In addition or alternatively, the resource utilization state can indicate whether the utilization of the resource is sparse. For example, the first wireless device can compare the detected utilization ratio with another predetermined threshold to obtain a result indicating whether the utilization of the resource is sparse, and take the result as the resource utilization state. For example, if the utilization ratio is lower than 20%, the resource utilization state indicates that the resource is sparse.

In addition or alternatively, the resource utilization state can indicate whether the utilization of the resource is normal.

For example, if the utilization ratio is larger than 20% but smaller than 50%, the resource utilization state indicates that the resource is normal. It is noted that the above predetermined thresholds can be preconfigured, specified in standard or broadcasted in physical layer, and their value can be set according to specific applications.

Referring back to FIG. 2, at step 202, the first wireless device can explicitly or implicitly signal the resource utilization state through broadcasting in the physical layer. The signaled resource utilization state is used for other wireless devices which receive the resource utilization state to determine whether and/or how to adjust their transmission behavior based on the resource utilization state.

After detecting the resource utilization state as described in the above, the first wireless device can signal it to other wireless devices in broadcasting channel (e.g. PD2DSCH). The signaling can be performed explicitly or implicitly. For explicit signaling, an indicator with one or more bits can be explicitly signaled to indicate the resource utilization state. The number of bits can be determined as required. For example, if only data resource or control resource needs to be indicated, 1 bit can be used to indicate whether the utilization of the resource collides, whether the resource is congested, or whether the utilization of the resource is sparse. If both data resource and control resource need to be indicated, 2 bits may need to indicate whether the utilization of the resource collides, whether the resource is congested, or whether the utilization of the resource is sparse. As another example, a two-bit indicator can be used, for example, "00" indicates that the resource is congested or the utilization of the resource collides, "01" indicates that the utilization of the resource is sparse, and "11" indicates that the utilization of the resource is normal. Alternatively, the resource utilization state can be implicitly signaled by reference signal (e.g. DMRS) sequence or pattern. That is, different reference signal sequences or patterns can indicate different resource utilization states.

The broadcasted resource utilization state is used for other wireless devices which receive the resource utilization state to determine whether and/or how to adjust their transmission behavior based on the resource utilization state. The details on the actions of the wireless devices which receive the resource utilization state will be described with reference to FIG. 4 in the following.

Figure 4:
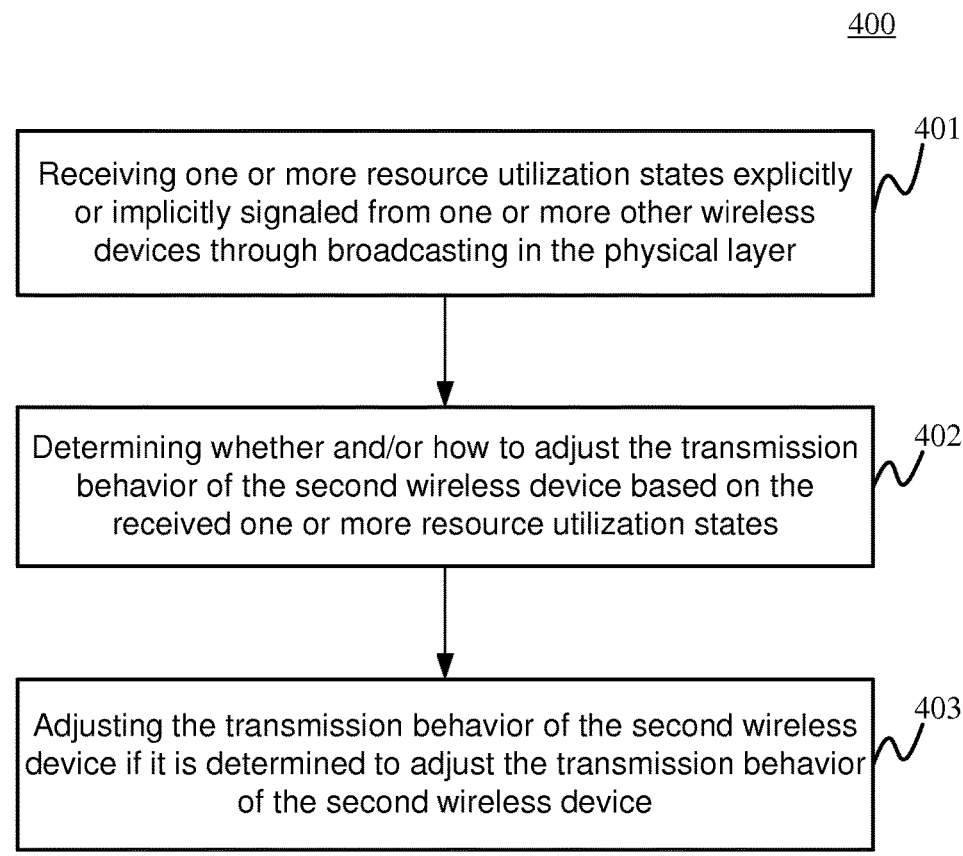
FIG. 4 illustrates a flowchart of a resource-utilization controlling method performed by a second wireless device according to an embodiment of the present disclosure.

FIG. 4 illustrates a flowchart of a resource-utilization controlling method 400 performed by a second wireless device which receives the resource utilization state according to an embodiment of the present disclosure.

In step 401, the second wireless device can receive one or more resource utilization states explicitly or implicitly signaled from one or more other wireless devices through broadcasting in the physical layer. As described in the above, the first wireless device would signal the resource utilization state to the second wireless device through broadcasting. In a D2D group, there can usually be more than two wireless devices, and thus the second wireless device may receive more than one resource utilization states from more than one other wireless devices. Therefore, the second wireless device can receive one or more resource utilization states. In another scenario, in a relatively long period, the second wireless device may receive more than one resource utilization states signaled form one other wireless device. As described in the above, each of the one or more resource utilization states can indicate a utilization state of the resource for the device-to-device communication when the utilization state was detected.

After receiving the resource utilization state, the second wireless device knows the utilization state of the resource. Therefore, in step 402, the second wireless device can determine whether and/or how to adjust the transmission behavior of the second wireless device based on the received one or more resource utilization states. Here, adjusting the transmission behavior can be performing backoff, adjusting a backoff parameter, reducing the transmission periodicity, or the like based on the signaled resource utilization states.

In one embodiment, the second wireless device can make determination based on one received resource utilization state. In other words, each time the second wireless device receives a resource utilization state, it makes determination based on the received resource utilization state. In particular, if any of the received one or more resource utilization states indicates that the utilization of the resource collides or the resource is congested, the second wireless device can determine that the transmission behavior of the second wireless device shall be adjusted in such a manner that the second wireless device performs backoff and/or adjusts its backoff parameter. In this case, once the second wireless device receives one resource utilization states that the utilization of the resource collides or the resource is congested, it determines to perform backoff and/or adjust its backoff parameter. Here, backoff refers to backoff for next transmission, and adjusting a backoff parameter can be for example increasing the transmission interval. Preferably, the second wireless device can adjust its backoff parameter based on its device ID and/or the subframe number for receiving the one resource utilization state. In this case, different receiving wireless devices can adjust their respective backoff parameters differently to avoid collision again. For example, one wireless device may double its transmission interval while another wireless device may increase its transmission interval by four times.

Alternatively or in addition, if any of the received one or more resource utilization states indicates that the utilization of the resource is sparse, it can be determined that the transmission behavior of the first wireless device shall be adjusted so as to improve the utilization ratio of the resource. In the case, the utilization ratio of the resource is too low; therefore the second wireless device can increase its usage of the resource, for example, reduce the transmission periodicity or align its transmission time with other wireless devices (for example, transmit data or control information in the same subframe with other wireless devices) to increase the utilization ratio of the resource.

Thereby, the resource utilization is improved and the load is balanced. In addition, preferably, if any of the received one or more resource utilization states indicates that the utilization of the resource is normal, it can be determined that the transmission behavior of the first wireless device shall not be adjusted.

Referring back to FIG. 4, at step 403, the second wireless device can adjust its transmission behavior if it is determined to adjust the transmission behavior of the second wireless device.

Figure 5:
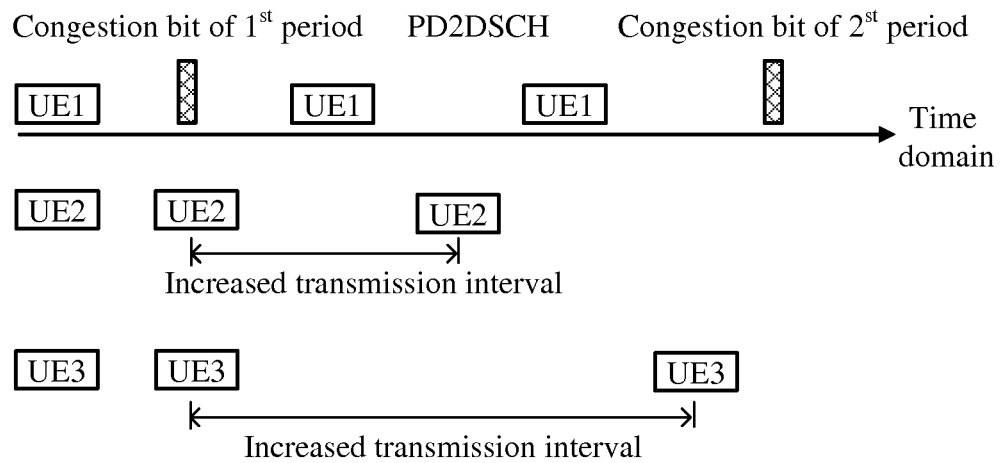
FIG. 5 schematically illustrates an embodiment of the present disclosure in which a UE makes determination based on one received resource utilization state.

FIG. 5 schematically illustrates a specific embodiment of the present disclosure in which a UE makes determination based on one received resource utilization state. In FIG. 5, UE1 has detected high resource utilization ratio of data channel (for example, the resource utilization ratio exceeds 50%) by for example monitoring the control channel and/or the data channel. Then UE1 sets a congestion bit (representing the resource utilization state) as "1" in PD2DSCH to indicate other UEs (UE2 and UE3 shown in FIG. 5) that current load of the data channel is congested. When UE2 and UE3 receive such a bit, they determine to adjust their next transmission. In this embodiment, UE2 and UE3 will adjust their transmission parameters differently (e.g. based on UE ID). For example, UE2 will increase transmission interval by three times but UE3 will increase the transmission interval by five times. This will avoid repeated collision between UE2 and UE3. It is noted that the congestion bit indicated in PD2DSCH could also reflect the state of control channel. As shown in FIG. 5, the congestion bit of $1^{st}$ period can reflect the situation of data channel and the congestion bit of $2^{st}$ period can reflect the situation of control channel. The usage of such a bit can be alternately switched or based on SFN and/or subframe number (index).

In another embodiment, the second wireless device can makes determination based on multiple resource utilization states within a predetermined time window. In this case, if more than a predetermined number of resource utilization states that indicate that the utilization of the resource collides or the resource is congested are received within a predetermined time window, it can be determined that the transmission behavior of the second wireless device shall be adjusted in such a manner that the second wireless device performs backoff and/or adjusts its backoff parameter. In other words, if the second wireless device receives N resource utilization states that indicate that the utilization of the resource collides or the resource is congested within a predetermined time window (for example, M TTIs) and N is larger than a predetermined number, then the second wireless device determines to adjust its transmission behavior. The multiple resource utilization states are usually received respectively from multiple UEs, but can also be received from one UE. The predetermined number can be set according to specific applications. Likewise, in this embodiment, if more than a predetermined number of resource utilization states that indicate that the utilization of the resource is sparse are received within a predetermined time window, it can be determined that the transmission behavior of the first wireless device shall be adjusted so as to improve the utilization ratio of the resource. Similarly, in this embodiment, the second wireless device can also adjust its backoff parameter based on its device ID and/or the subframe number(s) for receiving the multiple resource utilization states. If there are multiple subframes in which the resource utilization states are received, the adjustment can be based on for example the first subframe number, the last subframe number, the average of the subframe numbers, or any selected subframe number among them.

Figure 6:
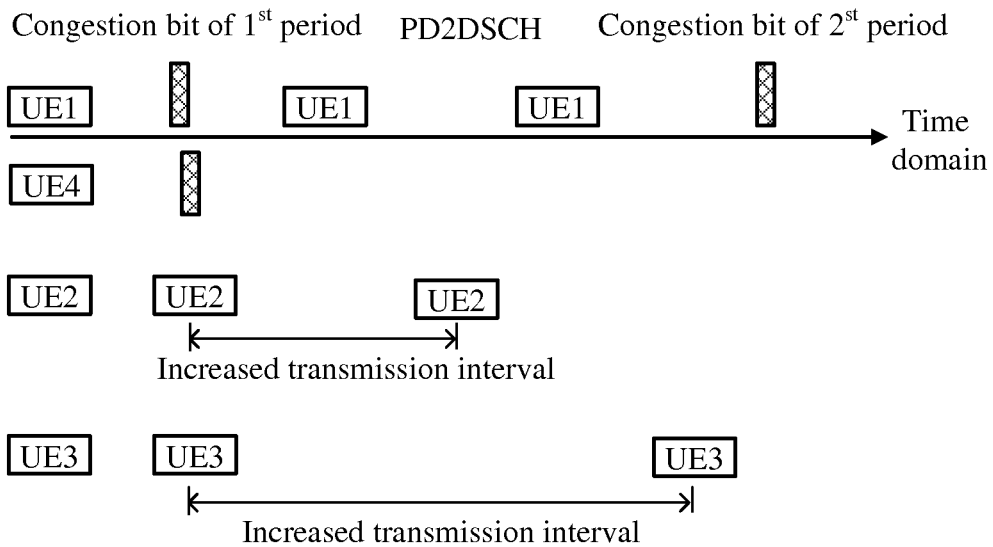
FIG. 6 schematically illustrates another embodiment of the present disclosure in which a UE makes determination based on multiple received resource utilization states.

FIG. 6 schematically illustrates another embodiment of the present disclosure in which a UE makes determination based on multiple received resource utilization states. In FIG. 6, both UE1 and UE 4 set the congestion bit as "1" in PD2DSCH within one TTI to indicate other UEs that current load of the data channel is congested. Therefore, UE2 and UE3 receive two such congestion bits within one TTI. In this embodiment, the predetermined number can be set as one within one TTI, that is, if more than one congestion bits with "1" are received within one TTI, UE2 and UE3 would determine to adjust their next transmission. Here, UE2 and UE3 receive two such congestion bits within one TTI, so that UE2 and UE3 will adjust their transmission parameters. It is noted that the predetermined number and the time window can be differently set for different UEs and the transmission parameters can also be adjusted differently for example based on UE ID.

Further, preferably, the resource utilization controlling method performed by the first wireless device can also comprise determining whether and/or how to adjust the transmission behavior of the first wireless device based on the resource utilization state and adjusting the transmission behavior of the first wireless device if it is determined to adjust the transmission behavior of the first wireless device. In other words, after the first wireless device detects the resource utilization state, it can also adjust its transmission behavior such as performing backoff, adjusting a backoff parameter, reducing the transmission periodicity, or the like based on the detected resource utilization state. In particular, if the resource utilization state indicates that the utilization of the resource collides or the resource is congested, it can be determined that the transmission behavior of the first wireless device shall be adjusted in such a manner that the first wireless device performs backoff and/or adjusts its backoff parameter. If the resource utilization state indicates that the utilization of the resource is sparse, it is determined that the transmission behavior of the first wireless device shall be adjusted so as to improve the utilization ratio of the resource. Preferably, the first wireless device can also adjust its backoff parameter based on its device ID and/or current subframe number.

Further, for both the first wireless device and the second wireless device, preferably, the initial backoff parameter or transmission interval can be set based on the device ID and/or subframe/SFN index at initial phase, i.e. before a wireless device has received any indication of resource utilization state from other wireless devices.

In addition, it is noted that the processes performed by the first wireless device and the second wireless device can be integrated into one wireless device.

According to the methods provided in the present disclosure, the load of a D2D group or cluster can be adaptively adjusted to keep a reasonable collision probability and resource utilization, especially in OOC scenario.

Figure 7:
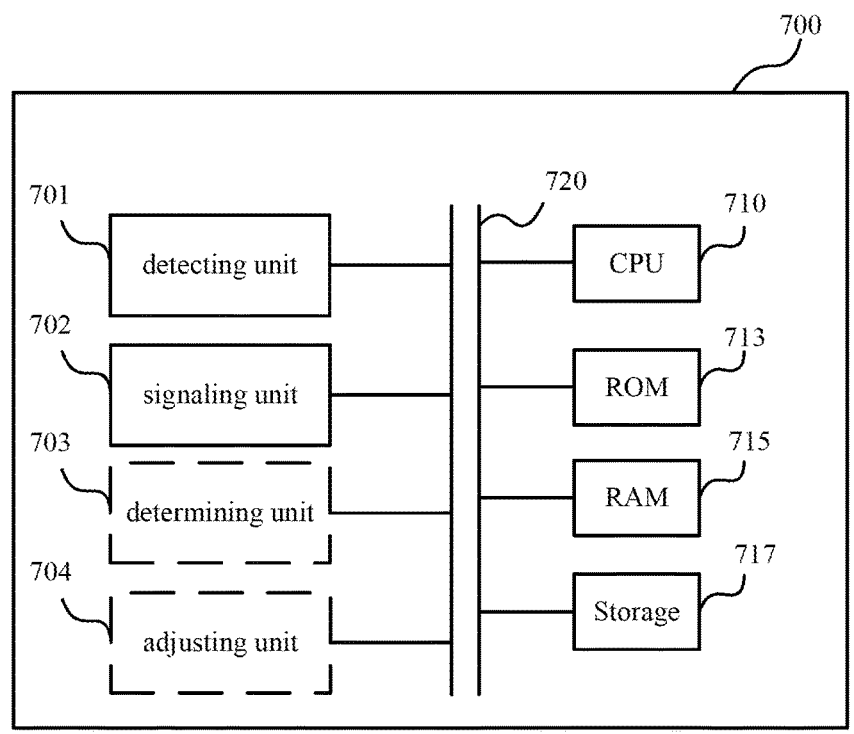
FIG. 7 is a block diagram illustrating a first wireless device according to an embodiment of the present disclosure.

In the present disclosure, a wireless device (e.g. UE) as a first wireless device for a device-to-device communication is provided. FIG. 7 is a block diagram illustrating a wireless device 700 as a first wireless device according to an embodiment of the present disclosure. The wireless device 700 comprises: a detecting unit 701 configured to detect current utilization state of the resource for the device-to-device communication as a resource utilization state by monitoring data channel and/or control channel of the device-to-device communication; and a signaling unit 702 configured to explicitly or implicitly signal the resource utilization state through broadcasting in the physical layer for other wireless devices which receive the resource utilization state to determine whether and/or how to adjust their transmission behavior based on the resource utilization state. Preferably, the wireless device 700 can also comprises a determining unit 703 configured to determine whether and/or how to adjust the transmission behavior of the first wireless device based on the resource utilization state and an adjusting unit 704 configured to adjust the transmission behavior of the first wireless device if it is determined to adjust the transmission behavior of the first wireless device.

The wireless device 700 according to the present disclosure may optionally include a CPU (Central Processing Unit) 710 for executing related programs to process various data and control operations of respective units in the wireless device 700, a ROM (Read Only Memory) 713 for storing various programs required for performing various process and control by the CPU 710, a RAM (Random Access Memory) 715 for storing intermediate data temporarily produced in the procedure of process and control by the CPU 710, and/or a storage unit 717 for storing various programs, data and so on. The above detecting unit 701, signaling unit 702, determining unit 703, adjusting unit 704, CPU 710, ROM 713, RAM 715 and/or storage unit 717 etc. may be interconnected via data and/or command bus 720 and transfer signals between one another.

Respective units as described above do not limit the scope of the present disclosure. According to one implementation of the disclosure, the functions of the above detecting unit 701, signaling unit 702, determining unit 703 and adjusting unit 704 may be implemented by hardware, and the above CPU 710, ROM 713, RAM 715 and/or storage unit 717 may not be necessary. Alternatively, the functions of the above detecting unit 701, signaling unit 702, determining unit 703 and adjusting unit 704 may also be implemented by functional software in combination with the above CPU 710, ROM 713, RAM 715 and/or storage unit 717 etc.

Figure 8:
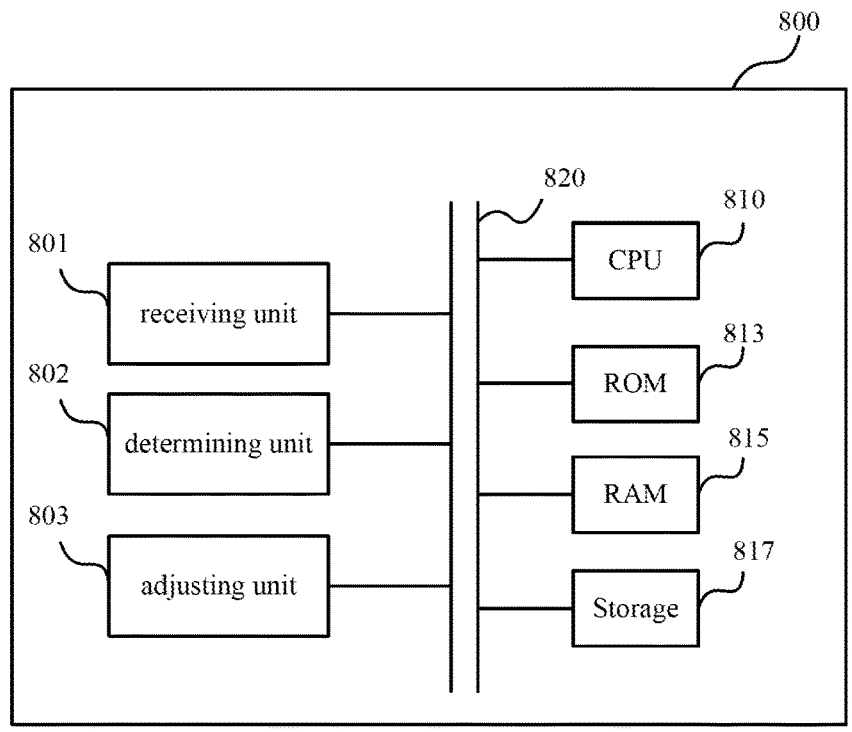
FIG. 8 is a block diagram illustrating a second wireless device according to an embodiment of the present disclosure.

Accordingly, in the present disclosure, a wireless device (e.g. UE) as a second wireless device for a device-to-device communication is provided. FIG. 8 is a block diagram illustrating a wireless device 800 as a second wireless device according to an embodiment of the present disclosure. The wireless device 800 comprises: a receiving unit 801 configured to receive one or more resource utilization states signaled from one or more other wireless devices through broadcasting in the physical layer, each of the one or more resource utilization states indicating a utilization state of the resource for the device-to-device communication when the utilization state was detected; a determining unit 802 configured to determine whether and/or how to adjust the transmission behavior of the second wireless device based on the received one or more resource utilization states; and an adjusting unit 803 configured to adjust the transmission behavior of the second wireless device if it is determined to adjust the transmission behavior of the second wireless device.

The wireless device 800 according to the present disclosure may optionally include a CPU (Central Processing Unit) 810 for executing related programs to process various data and control operations of respective units in the wireless device 800, a ROM (Read Only Memory) 813 for storing various programs required for performing various process and control by the CPU 810, a RAM (Random Access Memory) 815 for storing intermediate data temporarily produced in the procedure of process and control by the CPU 810, and/or a storage unit 717 for storing various programs, data and so on. The above receiving unit 801, determining unit 802, adjusting unit 803, CPU 810, ROM 813, RAM 815 and/or storage unit 817 etc. may be interconnected via data and/or command bus 820 and transfer signals between one another.

Respective units as described above do not limit the scope of the present disclosure. According to one implementation of the disclosure, the functions of the above receiving unit 801, determining unit 802 and adjusting unit 803 may be implemented by hardware, and the above CPU 810, ROM 813, RAM 815 and/or storage unit 817 may not be necessary. Alternatively, the functions of the above receiving unit 801, determining unit 802 and adjusting unit 803 may also be implemented by functional software in combination with the above CPU 810, ROM 813, RAM 815 and/or storage unit 817 etc.

It is noted that the above descriptions for the methods also apply to the devices, and the details are omitted here.

The present invention can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used. Further, the calculation of each functional block can be performed by using calculating means, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present invention intends to be variously changed or modified by those skilled in the art based on the description presented in the specification and known technologies without departing from the content and the scope of the present invention, and such changes and applications fall within the scope that claimed to be protected. Furthermore, in a range not departing from the content of the invention, the constituent elements of the above-described embodiments may be arbitrarily combined.

What is claimed is:

1. A resource-utilization controlling method for a device-to-device communication performed by a first wireless device, comprising:
   detecting a current utilization state of a resource for the device-to-device communication as a resource utilization state by monitoring a data channel and/or a control channel of the device-to-device communication;
   explicitly or implicitly signaling the resource utilization state through broadcasting in the physical layer for other wireless devices which receive the resource utilization state to determine whether and/or how to adjust their transmission behavior based on the resource utilization state;
   determining whether and/or how to adjust the transmission behavior of the first wireless device based on the resource utilization state; and
   adjusting the transmission behavior of the first wireless device if it is determined to adjust the transmission behavior of the first wireless device, wherein
   if the resource utilization state indicates that the utilization of the resource is sparse, it is determined that the transmission behavior of the first wireless device shall be adjusted so as to improve the utilization ratio of the resource.

2. The resource-utilization controlling method according to claim 1, wherein
   the resource utilization state indicates whether the utilization of the resource collides, whether the resource is congested, whether the utilization of the resource is sparse, and/or whether the utilization of the resource is normal.

3. The resource-utilization controlling method according to claim 1, wherein if the resource utilization state indicates that the utilization of the resource collides or the resource is congested, it is determined that the transmission behavior of the first wireless device shall be adjusted in such a manner that the first wireless device performs backoff and/or adjusts its backoff parameter.

4. The resource-utilization controlling method according to claim 1, wherein
the resource utilization state indicates the utilization state of data resource, or indicates the utilization state of control resource, or indicates both the utilization state of data resource and the utilization state of control resource, or indicates either the utilization state of data resource or the utilization state of control resource alternately or based on the system frame number or subframe number for signaling the resource utilization state.

5. The resource-utilization controlling method according to claim 1, wherein said signaling the resource utilization state comprising:
explicitly signaling an indicator with one or more bits to indicate the resource utilization state, or
implicitly signaling the resource utilization state by reference signal sequence or pattern.

6. A resource-utilization controlling method for a device-to-device communication performed by a second wireless device, comprising steps of:
receiving one or more resource utilization states explicitly or implicitly signaled from one or more other wireless devices through broadcasting in a physical layer, each of the one or more resource utilization states indicating a utilization state of a resource for the device-to-device communication when the utilization state was detected;
determining whether and/or how to adjust the transmission behavior of the second wireless device based on the received one or more resource utilization states; and
adjusting the transmission behavior of the second wireless device if it is determined to adjust the transmission behavior of the second wireless device, wherein
if any of the received one or more resource utilization states indicates that the utilization of the resource is sparse, it is determined that the transmission behavior of the second wireless device shall be adjusted so as to improve the utilization ratio of the resource.

7. The resource-utilization controlling method according to claim 6, wherein
if any of the received one or more resource utilization states indicates that the utilization of the resource collides or the resource is congested, it is determined that the transmission behavior of the second wireless device shall be adjusted in such a manner that the second wireless device performs backoff and/or adjusts its backoff parameter.

8. The resource-utilization controlling method according to claim 6, wherein
if more than a determined number of resource utilization states that indicate that the utilization of the resource collides or the resource is congested are received within a determined time window, it is determined that the transmission behavior of the second wireless device shall be adjusted in such a manner that the second wireless device performs backoff and/or adjusts its backoff parameter.

9. The resource-utilization controlling method according to claim 7, wherein the second wireless device adjusts its backoff parameter based on its device ID and/or the subframe number for receiving the one or more resource utilization states.

10. A resource-utilization controlling method for a device-to-device communication performed by a second wireless device, comprising steps of:
receiving one or more resource utilization states explicitly or implicitly signaled from one or more other wireless devices through broadcasting in the physical layer, each of the one or more resource utilization states indicating a utilization state of a resource for the device-to-device communication when the utilization state was detected;
determining whether and/or how to adjust the transmission behavior of the second wireless device based on the received one or more resource utilization states; and
adjusting the transmission behavior of the second wireless device if it is determined to adjust the transmission behavior of the second wireless device, wherein
if more than a determined number of resource utilization states that indicate that the utilization of the resource is sparse are received within a determined time window, it is determined that the transmission behavior of the second wireless device shall be adjusted so as to improve the utilization ratio of the resource.

11. A wireless device as a first wireless device for a device-to-device communication, comprising:
detecting circuitry, which, in operation, detects a current utilization state of a resource for the device-to-device communication as a resource utilization state by monitoring a data channel and/or a control channel of the device-to-device communication; and
signaling circuitry, which, in operation, explicitly or implicitly signals the resource utilization state through broadcasting in the physical layer for other wireless devices which receive the resource utilization state to determine whether and/or how to adjust their transmission behavior based on the resource utilization state;
determining circuitry, which, in operation, determines whether and/or how to adjust the transmission behavior of the first wireless device based on the resource utilization state; and
adjusting circuitry, which, in operation, adjusts the transmission behavior of the first wireless device if it is determined to adjust the transmission behavior of the first wireless device, wherein
if the resource utilization state indicates that the utilization of the resource is sparse, the determining circuitry determines that the transmission behavior of the first wireless device shall be adjusted so as to improve the utilization ratio of the resource.

12. A wireless device as a second wireless device for a device-to-device communication, comprising:
receiving circuitry, which, in operation, receives one or more resource utilization states signaled from one or more other wireless devices through broadcasting in a physical layer, each of the one or more resource utilization states indicating a utilization state of a resource for the device-to-device communication when the utilization state was detected;
determining circuitry, which, in operation, determines whether and/or how to adjust the transmission behavior of the second wireless device based on the received one or more resource utilization states; and
adjusting circuitry, which, in operation, adjusts the transmission behavior of the second wireless device if it is determined to adjust the transmission behavior of the second wireless device, wherein if any of the received one or more resource utilization states indicates that the utilization of the resource is sparse, the determining circuitry determines that the transmission behavior of the second wireless device shall be adjusted so as to improve the utilization ratio of the resource.

13. The wireless device according to claim 12, wherein if any of the received one or more resource utilization states indicates that the utilization of the resource collides or the resource is congested, the determining circuitry determines that the transmission behavior of the second wireless device shall be adjusted in such a manner that the second wireless device performs backoff and/or adjusts its backoff parameter.

14. The wireless device according to claim 12, wherein if more than a determined number of resource utilization states that indicate that the utilization of the resource collides or congested are received within a determined time window, the determining circuitry determines that the transmission behavior of the second wireless device shall be adjusted in such a manner that the second wireless device performs backoff and/or adjusts its backoff parameter.

15. A wireless device as a second wireless device for a device-to-device communication, comprising:

receiving circuitry, which, in operation, receives one or more resource utilization states signaled from one or more other wireless devices through broadcasting in a physical layer, each of the one or more resource utilization states indicating a utilization state of a resource for the device-to-device communication when the utilization state was detected;

determining circuitry, which, in operation, determines whether and/or how to adjust the transmission behavior of the second wireless device based on the received one or more resource utilization states; and adjusting circuitry, which, in operation, adjusts the transmission behavior of the second wireless device if it is determined to adjust the transmission behavior of the second wireless device, wherein if more than a determined number of resource utilization states that indicate that the utilization of the resource is sparse are received within a determined time window, the determining circuitry determines that the transmission behavior of the second wireless device shall be adjusted so as to improve the utilization ratio of the resource.

* * * * *